(12) United States Patent
Lin

(10) Patent No.: US 6,513,355 B1
(45) Date of Patent: Feb. 4, 2003

(54) AUTOMOBILE STEERING LOCK

(76) Inventor: Chuan-Chuan Lin, I-Hsiu No. 148, I-Hsiu Li Hsueh-Chia Chen, Tainan Hsien (TW)

( * ) Notice: Subject to any disclaimer, the term of this patent is extended or adjusted under 35 U.S.C. 154(b) by 0 days.

(21) Appl. No.: 10/028,491

(22) Filed: Dec. 28, 2001

(51) Int. Cl.[7] ............................ B60R 25/02; E05B 13/10
(52) U.S. Cl. ............................ 70/209; 70/226; 70/237; 70/238
(58) Field of Search ............................ 70/209–212, 225, 70/226, 237, 238

(56) References Cited

U.S. PATENT DOCUMENTS

| | | | | |
|---|---|---|---|---|
| 4,829,797 A | * | 5/1989 | Wu | 70/209 |
| 5,097,685 A | * | 3/1992 | Lien | 70/209 |
| 5,115,652 A | * | 5/1992 | Starmer | 70/209 |
| 5,257,518 A | * | 11/1993 | Hsieh | 70/209 |
| 5,297,406 A | * | 3/1994 | Lin | 70/209 |
| 5,353,615 A | * | 10/1994 | Chen | 70/209 |
| 5,400,627 A | * | 3/1995 | Liao | 70/209 |
| 5,426,960 A | * | 6/1995 | Jan | 70/209 |
| 5,440,908 A | * | 8/1995 | Lin | 70/209 |
| 5,454,242 A | * | 10/1995 | Su | 70/209 |
| 5,595,077 A | * | 1/1997 | Weng et al. | 70/209 |
| 5,609,050 A | * | 3/1997 | Yu | 70/209 |
| 5,671,619 A | * | 9/1997 | Hou | 340/425.5 |
| 5,676,000 A | * | 10/1997 | Chen | 307/10.2 |
| 5,718,133 A | * | 2/1998 | Chen et al. | 70/209 |
| 5,722,270 A | * | 3/1998 | Yu | 70/209 |
| 5,878,609 A | * | 3/1999 | Gorokhovsky et al. | 70/209 |
| 5,921,120 A | * | 7/1999 | Wu | 70/209 |
| 5,970,758 A | * | 10/1999 | Chen | 70/209 |
| 6,357,269 B1 | * | 3/2002 | Wu | 70/209 |
| 6,360,568 B1 | * | 3/2002 | Chen | 70/209 |

* cited by examiner

Primary Examiner—Anthony Knight
Assistant Examiner—John B. Walsh
(74) Attorney, Agent, or Firm—Troxell Law Office PLLC

(57) ABSTRACT

An automobile steering lock includes a protective plate, a lock member, a block plate and an activating rod. The protective plate covers the steering wheel of an automobile and is connected with other components. The lock member fixed on a side of the protective plate and has a lower portion provided with a projection to extend out of or shrink into its outer surface by a key. The block plate is pivotally connected with a side of the protective plate and possible to swing for a preset angle to press a portion of the steering wheel. The activating rod has a tubular portion formed in an upper end and the tubular portion has an inner annular groove for the projection of the lower portion of the lock member to extend in and lock or shrink and unlock the lock member by handling a key.

10 Claims, 9 Drawing Sheets

AUTOMOBILE STEERING LOCK

BACKGROUND OF THE INVENTION

This invention relates to an automobile steering lock, particularly to one having a handy but sophisticated structure capable to protect the steering wheel of an automobile from being unlocked or sawed off and thus preventing the automobile from being stolen.

A known first conventional automobile steering lock shown in FIG. 1 includes a lock member A1, a tubular member A2, and a rod member A3. The rod member A3 extends through a through hole A11 of the lock member A1 and in the tubular member A2 so as to telescope in the tubular member A2. The rod member A3 has a plurality of annular grooves A31 to engage with a locking means A12 of the lock member. The rod member A3 has a hook A32 formed at one end to hook one side of the steering wheel A4. Then the lock member A1 locks the other side of the steering wheel A4, with the tubular member A2 extending out of the steering wheel A4 so that the tubular member A2 may be stopped by the windshield or the body of a driver if the steering wheel should be rotated, preventing the steering wheel from rotated and consequently the automobile from being stolen.

The first known conventional automobile steering lock has the following disadvantages.

1. It is not handy. It functions to lock the steering wheel of an automobile by the rod member A3, the lock member A1 and the tubular member A2, and the tubular member A2 has to have a length enough to be stopped by the windshield, resulting in a heavy weight of the automobile steering lock, not easily handled.

2. It has an inferior anti-theft function. As long as the lock member A1 is sawed off the steering wheel shown in FIG. 1, it is easily taken off the steering wheel. Or the steering wheel together with it is taken off by unscrewing the steering wheel, and then a new steering wheel without an automobile steering lock is newly screwed on to steal the automobile.

3. It cannot protect the steering wheel A4 of an automobile from being taken off by means of the rod member A3 so that a safety air sack may be easily stolen to result in a loss to the owner.

A second known conventional automobile steering lock shown in FIG. 2 includes an engage plate device B2 consisting of a plate member B21, a hook B22, an engage member B23 respectively provided under two opposite sides of the plate member B21, a hollow guide member B24 provided on a front upper side of the plate member A21 for an actuating rod B4 to penetrate in, and a block plate pivotally connected with a lengthwise side of the plate member B21. Then the engage plate device B2 is locked (or engaged) on the steering wheel of an automobile with the block plate blocking the steering wheel and with the activating rod B4 freely extending in the hollow guide member B24 and with the lock member locking the steering wheel in its place, preventing the steering wheel from being sawed off. But in order to permit the hook B22 and the engage member B23 respectively to engage two opposite sides of the steering wheel, the plate member B21 has to have a length enough to result in a heavy weight of the steering lock. And the activating rod B4 also has to have a length comparatively long to increase the weight of the steering lock to let the lock not be so easily handled.

SUMMARY OF THE INVENTION

An automobile steering lock in the present invention has been devised to include a protective plate to be covered on the steering wheel of an automobile, a lock member fixed on a side of the protective plate to be locked and unlocked with a key, a projection provided on a lower portion of the lock member, a block plate pivotally connected with a side of the protective plate to rotate for an angle to block the steering wheel, and an activating rod having a tubular portion to align and fit around the lower portion of the lock member so as to let the projection of the lower portion engage the inner annular groove to lock the lock member.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
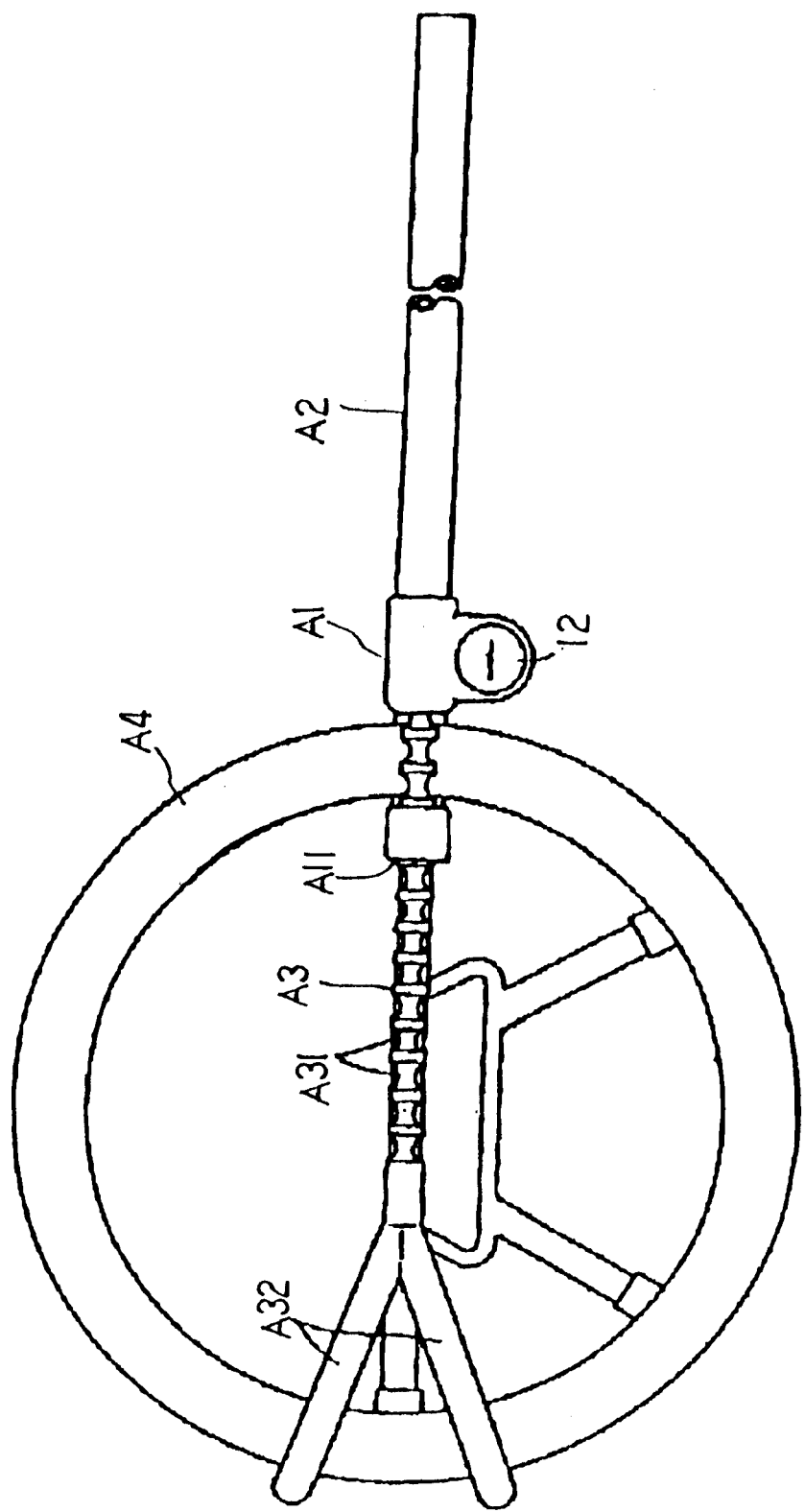
FIG. 1 is a perspective view of a first known conventional automobile steering lock locked on the steering wheel.

A preferred embodiment of an automobile steering lock in the present invention, as shown in FIGS. 3, 4, 5 and 6, includes a protective plate (1), a lock member (2), a block plate (3), and an activating rod (4) as main components combined together.

The protective plate (1) is to be covered on the steering wheel (6) of an automobile for arranging other components thereon, having a bent-down pivotal plate (11) with a pivotal hole (110) respectively at two sides of a front end for pivotally connecting the block plate (3), and a side rod (12) vertically extending down from a front portion.

The lock member (2) is fixed in a right lengthwise side of the protective plate (1), having a key hole for a key to insert in for rotating to lock and unlock the lock member (2), and a lower portion (21) and a projection (210) formed on an outer surface of the lower portion (21) and possible to shrink in or extend out of the outer surface.

The block plate (3) is L-shaped, having a horizontal portion extending rearward from a lower end of a vertical portion and having an opening (31) and a pair of projecting tips (32) bent inward to define the mouth of the opening (31). The block plate (3) is pivotally connected with the protective plate (1) by means of the two pivotal plates (11), and capable to swing for an angle by means of the pivotal holes (110) so as to press against a portion of the steering wheel in locking The activating rod (4) is vertical, having a tubular member (41) formed in an upper end and aligned vertically to the lower portion (21) of the lock member (2). The tubular member (41) has two opposite vertical slots 411 in the annular wall for the two projecting tips (32) of the block plate (3) to fit and move up and down therein, with the tubular member (41) capable to move up and down in the opening (31) of the block plate (3). Further, the tubular member (41) has an inner annular groove (42) for the projection (210) of the lower portion (21) of the lock member (2) to fit therein and secured in place to lock the lock member, after the lower portion (21) is fitted in the tubular member (41).

Figure 4:
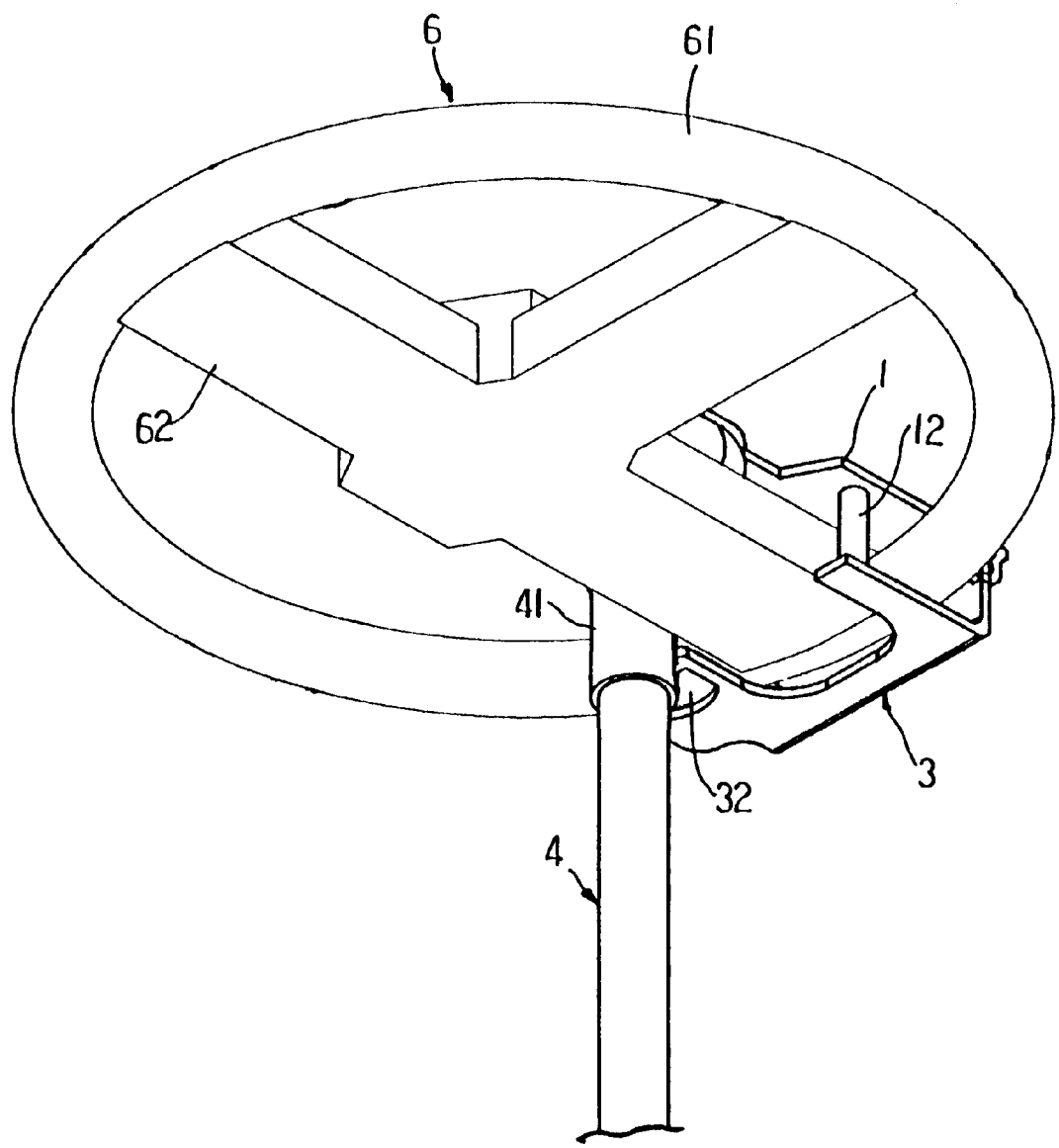
FIG. 4 is a perspective view of the automobile steering lock in the locked condition in the present invention.
Figure 5:
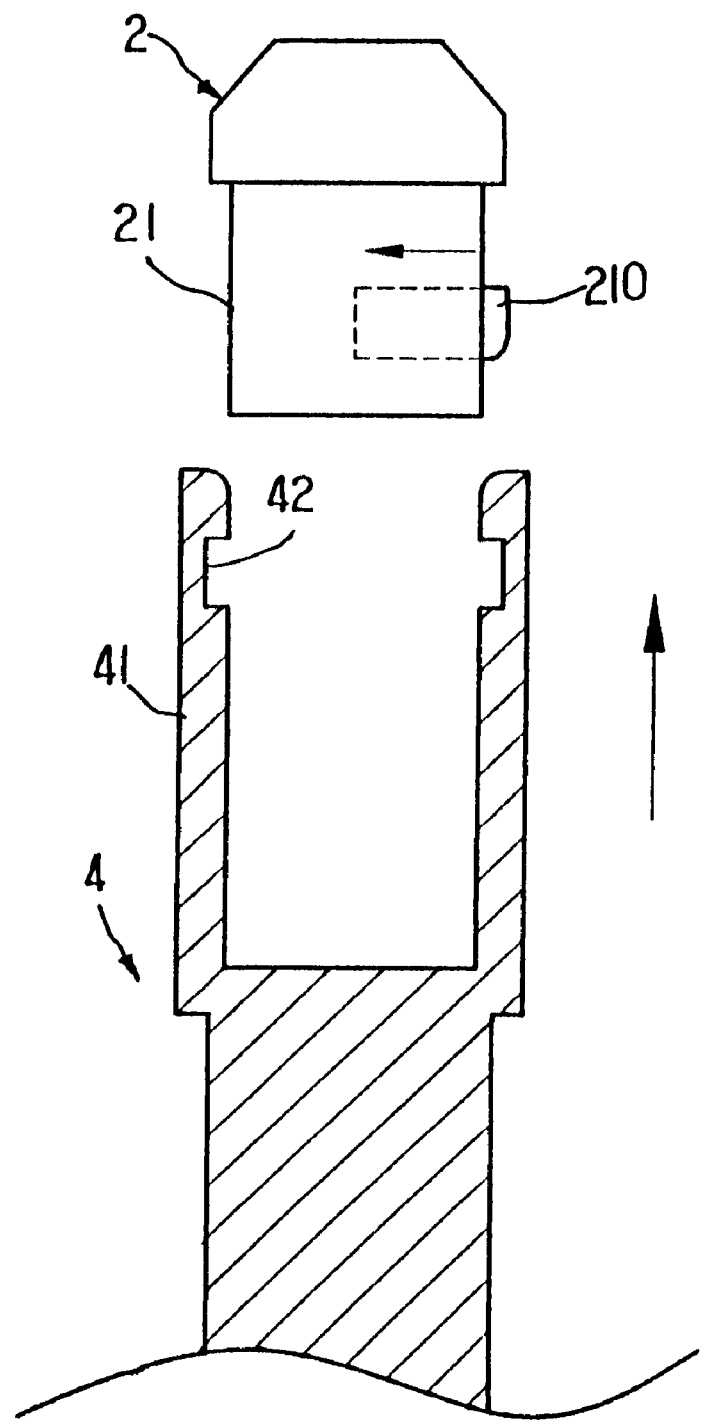
FIG. 5 is a side cross-sectional view of a lock member and an activating rod to engage with each other in the present invention.

Next, how to lock this automobile steering lock on the steering wheel of an automobile is to be described. As shown in FIGS. 4 and 5, common automobile steering wheels (6) generally have an annular handle (61) affixed with two or three protective ribs (62) inside the handle (61). So the protective plate (1) is firstly placed on the annular handle (61) and the connecting point of one of the protective ribs (62), and then the block plate (3) is rotated for an angle to keep the annular handle (61) and the protective rib (62) between the protective plate (1) and the block plate (3), with the side rod (12) of the protective plate (1) and the opening (32) separately positioned at two sides of the rib (62). Then the activating rod (4) is pushed upward to fit around the lower portion (21) of the lock member (2), letting the projection (210) of the lower portion (21) engage with the annular groove (42) to secure the activating rod (4) with the lock member (2) for locking the automobile steering lock. And in order to smooth the locking process, as shown in FIG. 5, the projection (210) has its corners rounded and so does the annular groove (42) so long as the annular groove (42) diminishes its engaging force.

When the automobile steering lock is to be unlocked, a key is used to rotate the lock member (4) to let the projection (210) shrink inward to disengage from the inner annular groove (42), and the activating rod (4) is pulled down to leave the lower portion (210) of the lock member (2), with the block plate (3) rotated a little in its angle to leave the handle (61), then the automobile steering lock can be taken off the steering wheel (6).

Figure 6:
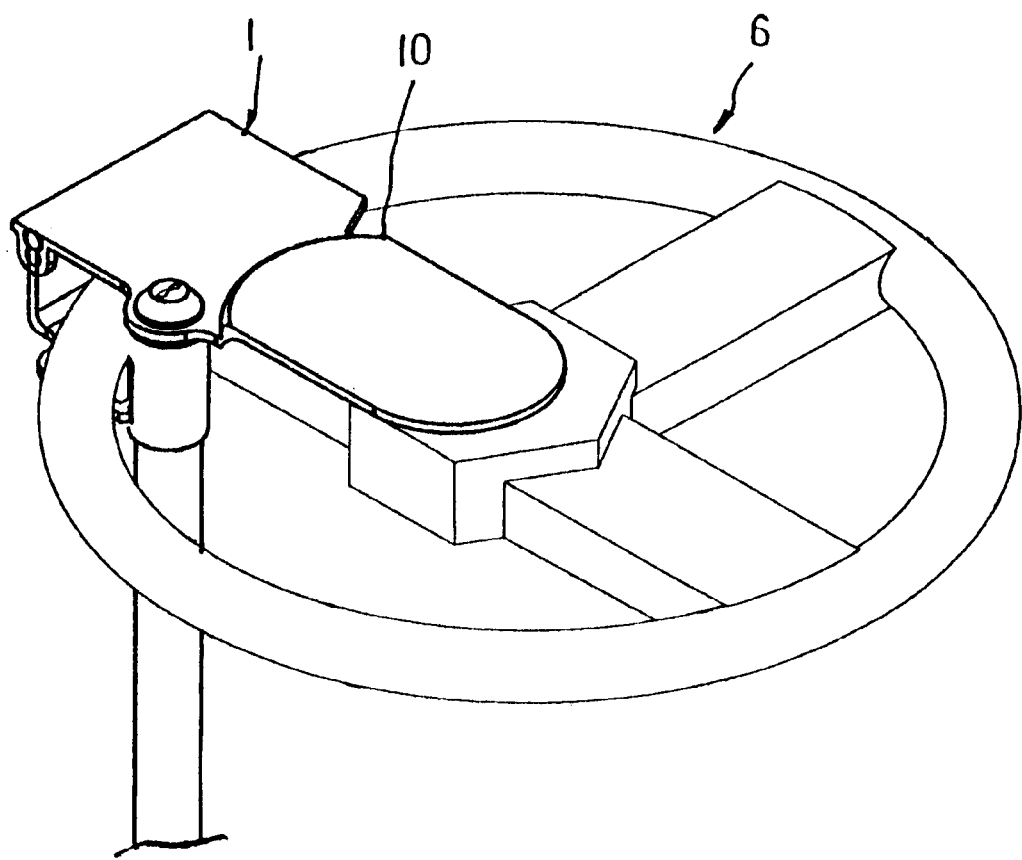
FIG. 6 is another perspective view of the automobile steering lock in the locked condition in the present invention.

Next, as shown in FIG. 6, the protective plate (1) may be provided with an extension flat plate (10) on an upper surface so as to cover on the steering wheel, in which a safety air sack is contained, to protect the safety air sack from being stolen.

Figure 2:
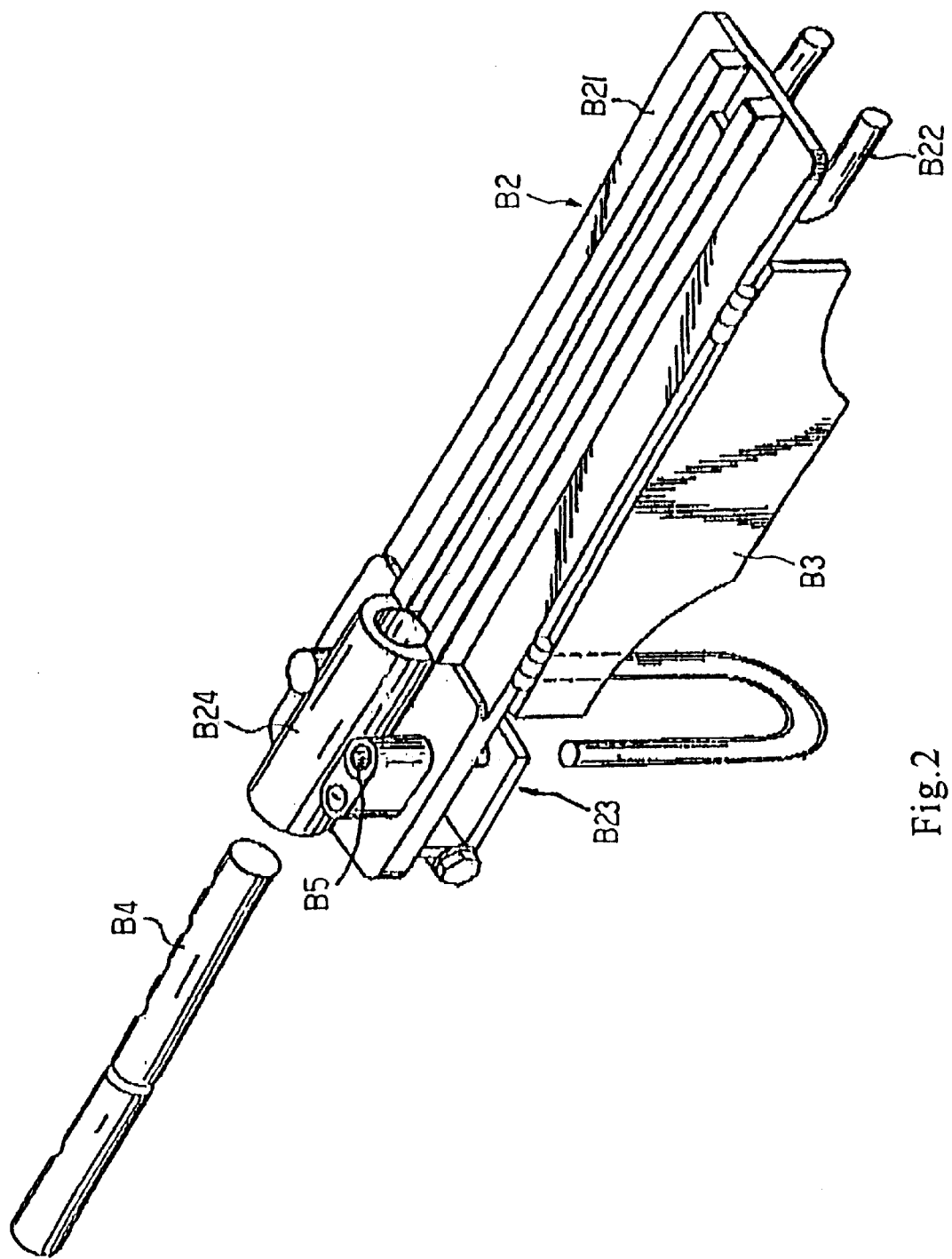
FIG. 2 is a perspective view of a second known conventional automobile steering wheel lock.
Figure 3:
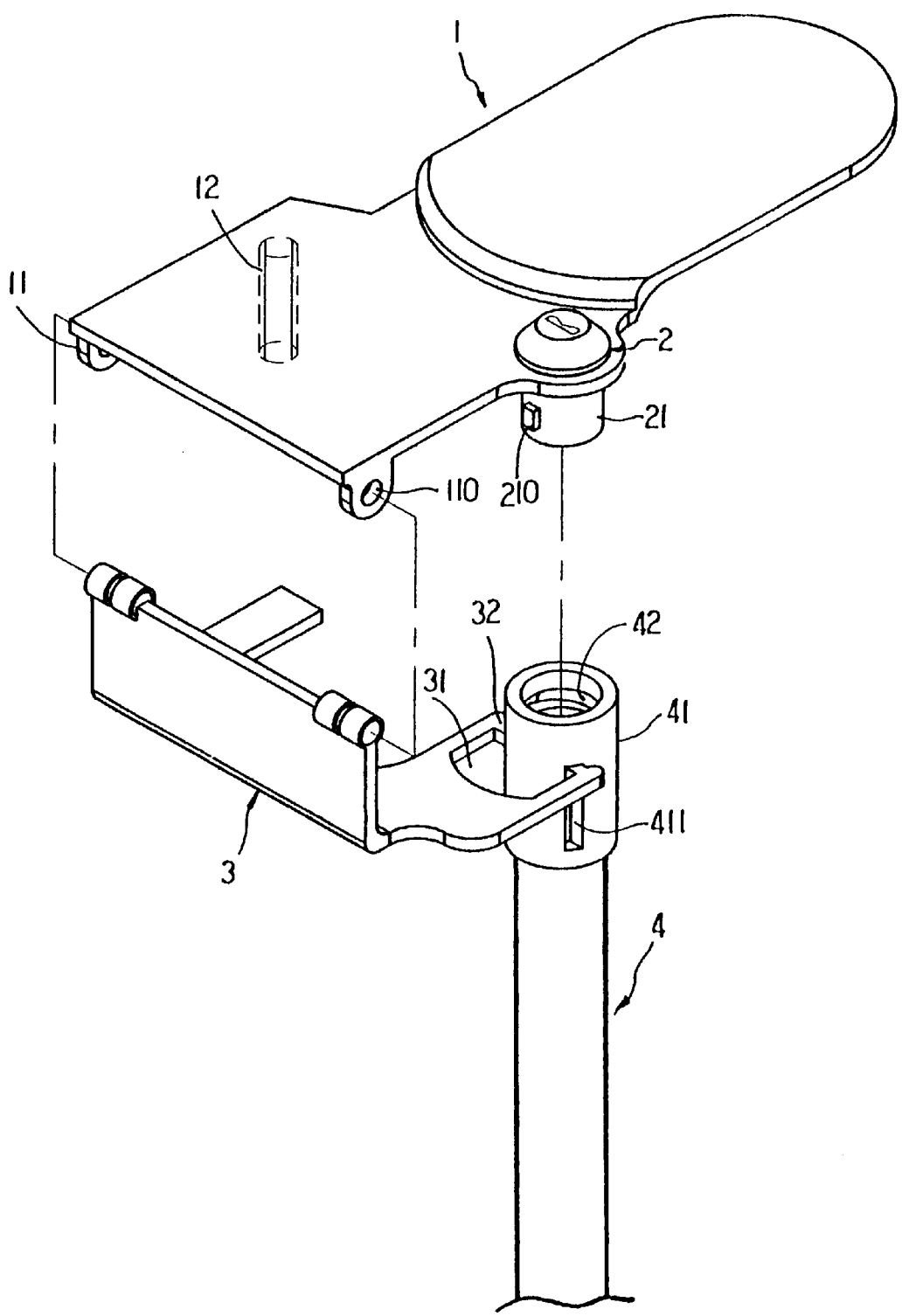
FIG. 3 is an exploded perspective view of an automobile steering lock in the present invention.
Figure 7:
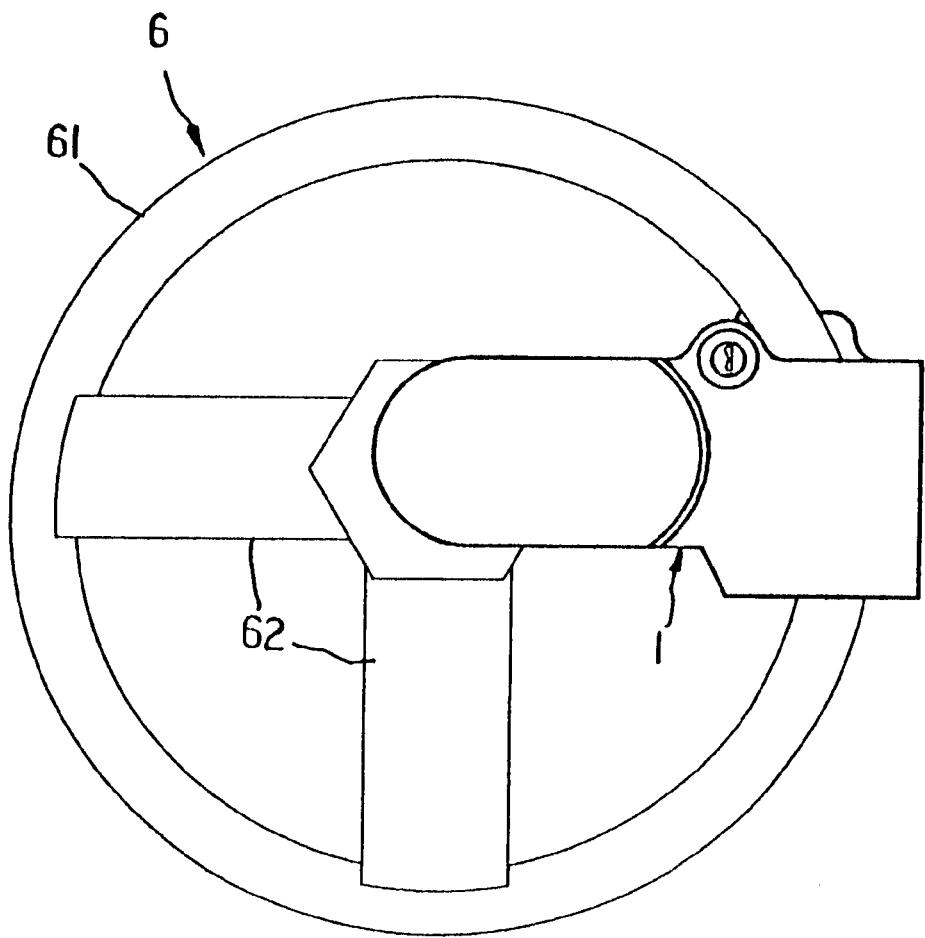
FIG. 7 is an upper view of the automobile steering lock in the present invention.
Figure 8:
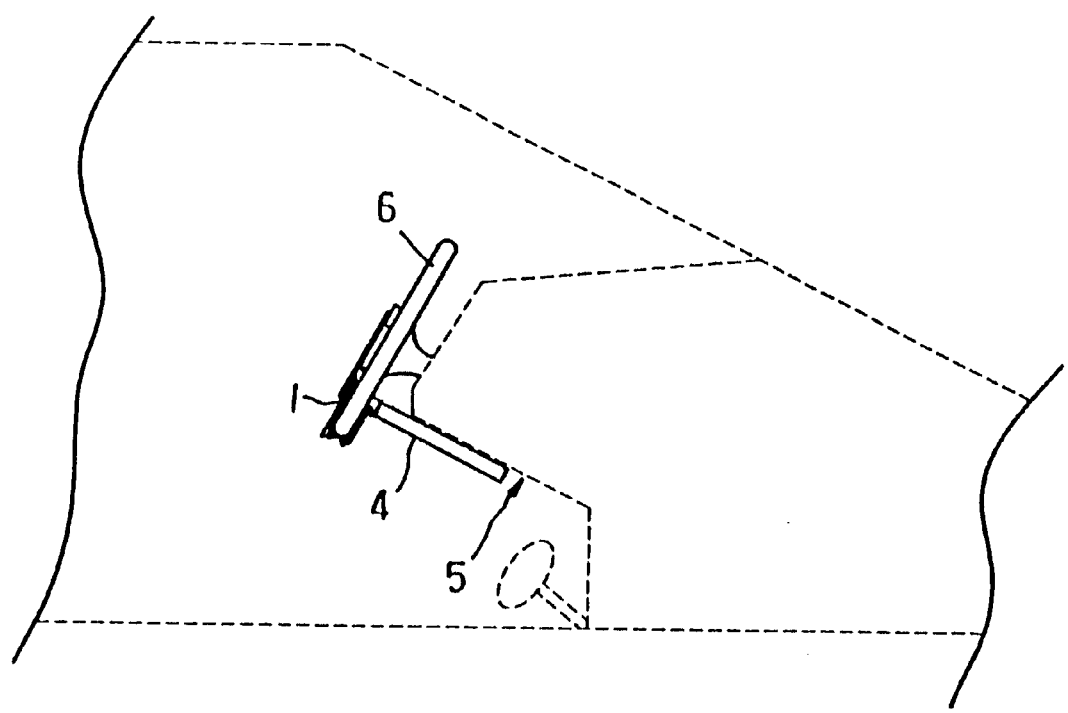
FIG. 8 is a side view of the automobile steering lock locked on the steering wheel of an automobile in the present invention.

As can be understood from FIGS. 7 and 8, the automobile steering lock in the invention is locked on the annular handle (61) and anyone of the protective ribs (62) of the steering wheel (6) and then the activating rod (4) extends to be located in the space (5) under the driver'seat or on the body of a driver so as to prevent the steering wheel from being rotated. Therefore, the activating rod (4) does not need a comparatively long length, and moreover, the protective plate (1) only needs to extend on the center of the steering wheel (6), nearly a half shorter than the engage plate device shown in FIG. 2, resulting in a small size and a light weight of the lock, handy to handle.

In addition, the protective plate (1) covers on the upper surface of the steering wheel (6) in locking, a would-be thief cannot directly screw off the steering wheel (6), preventing the safety air sack from being stolen. Further, the annular handle (61) and the connecting point of the protective rib (62) are covered by the automobile steering lock, the lock is impossible to be sawed off the steering wheel, securing the locking effect.

Figure 9:
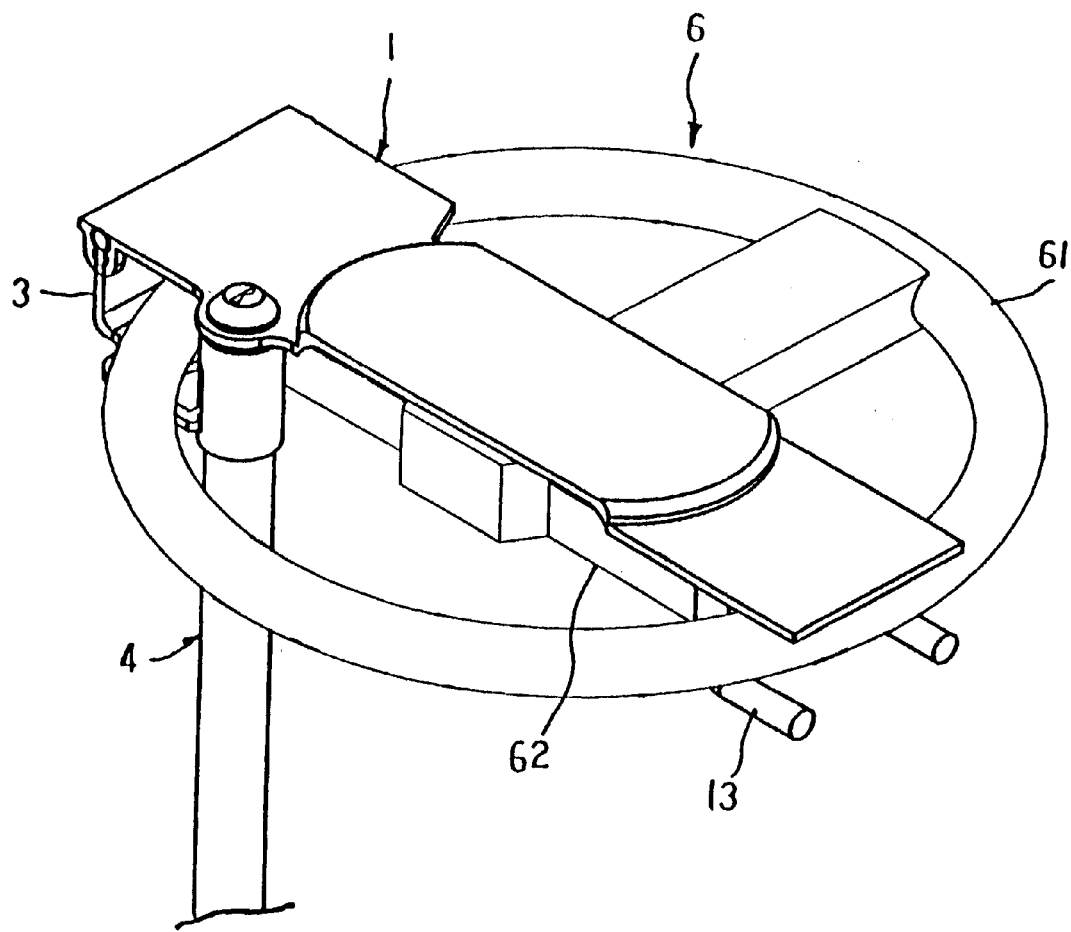
FIG. 9 is a perspective view of another embodiment of an automobile steering lock in the present invention.

Lastly, another embodiment of an automobile steering lock is shown in FIG. 9, having almost the same structure of the automobile steering lock described above, but the protective plate (1) extends as far as the other side of the annular handle (61) and the connecting point of the protective rib (62) and the handle (61) of the steering wheel (6), and a U-shaped hook (13) is additionally provided under the connecting point of the handle (61) and the protective rib (62). Then the U-shaped hook (13) extends under the handle (61) and the protective plate (1) covers on the handle (61), with the block plate (3) rotated and secured in place by means of the activating rod (4). Although the protective plate (1) is increased in its length, its thickness can be lessened to decrease the weight of the protective plate (1). So the whole weight of the lock may not be increased, still handy to handle.

The automobile steering lock in the invention has the following advantages, as can be seen from the aforesaid description.

1. It has a small size and a lightweight, handy to handle.
2. The protective plate covers the steering wheel, protecting the steering wheel from being directly screwed off or the safety air sack from being stolen.
3. It locks the annular handle and the connecting point of any of the protecting ribs, not permitting it to be sawed off the steering wheel, securing the locking effect.

While the preferred embodiment of the invention has been described above, it will be recognized and understood that various modifications may be made therein and the appended claims are intended to cover all such modifications that may fall within the spirit and scope of the invention.

I claim:

1. An automobile steering lock comprising:
    a protective plate covering on a steering wheel of an automobile for arranging other components thereon;
    a lock member fixed on one side of said protective plate, having a key hole for a key to rotate for locking and unlocking, a lower portion and a projection provided on an outer surface of said lower portion and possible to shrink in or extend out of the outer surface;
    a block plate pivotally connected to one side of said protective plate, possible to swing for a preset angle for pressing against a portion of the steering wheel in locking;
    an activating rod having a tubular portion formed in an upper end, connected to one side of said block plate and positioned under and aligned to said lower portion of said lock member, said tubular portion having an inner annular groove for said projection of said lower portion of said lock member to fit therein and secured in place to lock said lock member.

2. The automobile steering lock as claimed in claim 1, wherein said protective plate has a pivotal plate respectively at two sides of a front end, and said pivotal late has a pivotal hole.

3. The automobile steering lock as claimed in claim 1, wherein said block plate has a horizontal portion extending rearward from a vertical portion, said horizontal portion has an opening and two opposite projecting tips defining a mouth of the opening, and said activating rod has two opposite vertical slots in an annular wall for said two projecting tips to fit and move up and down therein.

4. The automobile steering lock as claimed in claim 1, wherein said protective plate has a side rod extending down in one side.

5. The automobile steering lock as claimed in claim 1, wherein said block plate is L-shaped.

6. The automobile steering lock as claimed in claim 1, wherein said projection of said lower portion of said lock member has its corners rounded.

7. The automobile steering lock as claimed in claim 1, wherein said inner annular groove of said tubular portion of said activating rod has its corners rounded.

8. The automobile steering lock as claimed in claim 1, wherein said protective plate further has an extensive flat plate on its upper surface.

9. The automobile steering lock as claimed in claim 1, wherein said protective plate has a length extending as far as the other side of the steering wheel.

10. The automobile steering lock as claimed in claim 1, wherein said protective plate has a U-shaped hook provided under the other side.

\* \* \* \* \*